United States Patent
Maki

Patent Number: 5,256,606
Date of Patent: Oct. 26, 1993

[54] MOISTURE RESISTANT LOW MELTING POINT GLASS FOR MAGNETIC HEAD AND MAGNETIC HEAD

[75] Inventor: Satoshi Maki, Nagaoka, Japan

[73] Assignee: Alps Electric Co., Ltd., Tokyo, Japan

[21] Appl. No.: 891,481

[22] Filed: May 28, 1992

[30] Foreign Application Priority Data

Jun. 13, 1991 [JP] Japan .................. 3-142157

[51] Int. Cl.$^5$ .......... C03C 3/102; C03C 3/70; C03C 3/72; C03C 3/108
[52] U.S. Cl. .......... 501/60; 501/74; 501/75; 501/76; 360/119; 360/120; 360/125; 360/126
[58] Field of Search .......... 501/74, 75, 60, 76; 360/119, 120, 125, 126

[56] References Cited

U.S. PATENT DOCUMENTS

4,997,796  3/1991  Toyoshima et al. .......... 501/75

FOREIGN PATENT DOCUMENTS

62-39268   2/1987  Japan .
62-288133  12/1987 Japan .
4-31338    2/1992  Japan .

*Primary Examiner*—Karl Group
*Assistant Examiner*—C. M. Bonner
*Attorney, Agent, or Firm*—Guy W. Shoup; Patrick T. Bever

[57] ABSTRACT

The present invention relates to a moisture resistant low melting point glass composition for a magnetic head and a magnetic head utilizing it. Said glass composition may be composed of 28-35% PbO, 38-50% $SiO_2$, 3-10% $R_2O$, 3-8% $TeO_2$, and 1-5% $TiO_2$ in terms of mole ratio, or 30-40% PbO, 30-40% $SiO_2$, 10-20% $B_2O_3$, 8% or less $TeO_2$ and 10% or less $Bi_2O_3$, cr 30-40% PbO, 30-40% $SiO_2$, 10-20% $B_2O_3$, and 0-8% $TeO_2$, or 30-40% PbO, 30-40% $SiO_2$, 10-20% $B_2O_3$, and 0-10% $Bi_2O_3$.

4 Claims, 1 Drawing Sheet

MOISTURE RESISTANT LOW MELTING POINT GLASS FOR MAGNETIC HEAD AND MAGNETIC HEAD

BACKGROUND OF THE INVENTION

The present invention relates to a moisture resistant low melting point glass composition for a magnetic head and a magnetic head, and more particularly to a glass composition used for the formation of a gap in a magnetic head or for coupling and filling the components of a head, and to a magnetic head utilizing it.

A glass composition for a magnetic head is used for various purposes, such as the fabrication of a magnetic head by joining a plurality of core chips made of a magnetic material such as ferrite and ferromagnetic metals, the embedding of the core chips thus formed in a slider made of ceramic or the like, the formation of the gaps between the cores, and filling or reinforcing the gaps between the core chips and other components of the head.

It is known that glasses mainly composed of PbO which are welded at low temperatures are appropriate as this type of glass composition, and various glass compositions mainly composed of PbO have been developed. As examples of this type of glass compositions mainly composed of PbO, a glass composition containing 27% PbO, 53% $SiO_2$, 4.5% $B_2O_3$, 5% $Na_2O$, 0.5% $K_2O$, 5% $Li_2O$, and 5% ZnO in terms of mole ratio, and a glass composition containing 47% PbO, 23% $SiO_2$, 17% $B_2O_3$, 3% $Na_2O$, and 11% $Al_2O_3$ in terms of mole ratio are known.

However, such conventional glass compositions have a problem that they are poor in environmental durability especially in moisture resistance and water resistance. This has resulted in shortcomings such as alteration on the glass surface leading to discoloration, and a step formed between the surface of the glass and the slider which decrease the yield of a slider production process. The reason is that, in a glass composition containing too much PbO, PbO is dissolved in the moisture that adheres on the surface of the glass. Glasses having other compositions have problems in that those having high moisture resistance melt at high temperatures and those melting at low temperatures have poor moisture resistance. Therefore, a glass composition which has good moisture resistance and melts at low temperatures, is needed.

Further, when a step is formed on the surface of a glass as described above, it significantly deteriorates the reliability of a magnetic head, especially a digital head, and actually leads to damages on a recording medium. In the case of a magnetic head having a small gap width, there is a possibility that conventional glass compositions will no longer be usable as gap-filling materials. Therefore, a novel glass composition is needed.

SUMMARY OF THE INVENTION

The present invention has been conceived to solve the above-mentioned problems, and it is an object of the present invention to provide a glass composition for a magnetic head which has a low glass-transition point and low working temperature for a welding operation, which is not discolored, and which is excellent in environmental durability, especially in moisture resistance, and to provide a magnetic head utilizing it.

In order to solve the above-mentioned problems, the first invention is composed of 28–35% PbO, 38–50% $SiO_2$, 3–10% $R_2O$, 3–8% $TeO^2$, and 1–5% $TiO_2$ in terms of mole ratio ($R_2O$ represents at least two kinds out of $Na_2O$, $K_2O$, and $Li_2O$.).

In order to solve the above-mentioned problems, the second invention is composed of 30–40% PbO, 30–40% $SiO^2$, 10–20% $B_2O_3$, 8% or less $TeO_2$, and 10% or less $Bi_2O_3$ in terms of mole ratio, and satisfies a relationship of $TeO_2 + Bi_2O_3 \geq 5\%$.

In order to solve the above-mentioned problems, the third invention is composed of 30–40% PbO, 30–40% $SiO_2$, 10–20% $B_2O_3$, and 0–8% $TeO_2$ in terms of mole ratio.

In order to solve the above-mentioned problems, the fourth invention is composed of 30–40% PbO, 30–40% $SiO_2$, 10–20% $B_2O_3$, and 0–10% $Bi_2O_3$ in terms of mole ratio.

In order to solve the above-mentioned problems, in a magnetic head wherein a head core surrounded by a glass portion is embedded in a groove formed in a slider and a magnetic gap is formed by the head core or by the head core and the slider, the fifth invention comprises said glass portion composed of the moisture resistant low melting point glass composition for a magnetic head according to the first invention.

In order to solve the above-mentioned problems, in a magnetic head wherein a head core surrounded by a glass portion is embedded in a groove formed in a slider and a magnetic gap is formed by the head core or by the head core and the slider, the sixth invention comprises said glass portion composed of the moisture resistant low melting point glass composition for a magnetic head according to the second invention.

In order to solve the above-mentioned problems, in a magnetic head wherein a head core surrounded by a glass portion is embedded in a groove formed in a slider and a magnetic gap is formed by the head core or by the head core and the slider, the seventh invention comprises said glass portion composed of the moisture resistant low melting point glass composition for a magnetic head according to the third invention.

In order to solve the above-mentioned problems, in a magnetic head wherein a head core surrounded by a glass portion is embedded in a groove formed in a slider and a magnetic gap is formed by the head core or by the head core and the slider, the eighth invention comprises said glass portion composed of the moisture resistant low melting point glass composition for a magnetic head according to the fourth invention.

In the glass composition according to the first invention, PbO is added to improve flowability while lowering the softening point. When PbO content is less than 28 mole %, flowability is insufficient and, when it exceeds 35 mole %, chemical durability is deteriorated.

When $SiO_2$ content is less than 38 mole %, chemical durability and flowability are deteriorated and, when it exceeds 50 mole %, the working temperature becomes too high resulting in a too small expansion coefficient. $R_2O$ (the oxide of an alkali metal) is added to raise the expansion coefficient while lowering the softening point. When $R_2O$ content is less than 3 mole %, said effects are not obtained and, when it exceeds 8 mole %, the expansion coefficient becomes too high resulting in deterioration of chemical durability.

$TeO_1$ is added to improve flowability. When the content of it is less than 3 mole %, said effect is not obtained and, when it exceeds 8 mole %, the expansion coefficient becomes too high and chemical durability is deteriorated. $TiO_2$ improves chemical durability but this effect is not obtained when the content of it is less than 1 mole % and, when it exceeds 5 mole %, there is a possibility of crystal deposition during re-heating.

The glass composition according to the first invention may be added with ZnO less than 6 mole % and $B_2O_3$ less than 12 mole % individually or in combination as needed. Although ZnO improves chemical durability, it is not preferable to add 6 mole % or more ZnO because flowability is deteriorated and the working temperature is raised. Although $B_2O_3$ may be added to adjust the viscosity of the glass composition, 12 mole % or more $B_2O_3$ results in a too low expansion coefficient.

In a glass composition according to the second, third, or fourth invention, PbO is added to improve flowability. while lowering the softening point. When PbO content is less than 30 mole %, flowability is insufficient and, when it exceeds 40 mole %, chemical durability is deteriorated. When $SiO_2$ content is less than 30 mole %, chemical durability and flowability are deteriorated and, when it exceeds 40 mole %, the working temperature becomes too high resulting in a too small expansion coefficient. When $B_2O_3$ content is less than 10%, the glass composition tends to devitrify and, when it exceeds 20 mole %, chemical durability is deteriorated resulting in a small expansion coefficient.

Although $Bi_2O_3$ improves the flowability of the glass composition, the glass composition tends to devitrify when it exceeds 10 mole %. $TeO_2$ and $Bi_2O_3$ do not present their effects unless they are added in a quantity equal to or more than 5 mole % in total.

Further, a glass composition according to the second, third or fourth invention, may be added with 6 mole % or less SrO, 6 mole % or less ZnO, and 0.5 mole % or less $SbO_3$ individually or in combination as needed. SrO and ZnO contents in excess of said mole percentages raise the working temperature during glass-filling. $Sb_2O_3$ is a clarifier. When it is added in excess of 0.5 mole %, the glass composition will be highly likely to devitrify.

As will be proved in an example of fabrication to be described later, the glass composition according to the first invention has a glass transfer point of 383°-396° C. which is sufficiently low and has a thermal expansion coefficient of 96-106 which provides excellent moisture resistance. Further, as will be proved in an example of fabrication to be described later, a glass composition according to the second, third or fourth invention has a glass-transition point of 405-430 which is sufficient for use for a magnetic head, and has a thermal expansion coefficient of 88-94 which provides excellent moisture resistance.

DETAILED DESCRIPTION OF THE INVENTION

Figure 1:
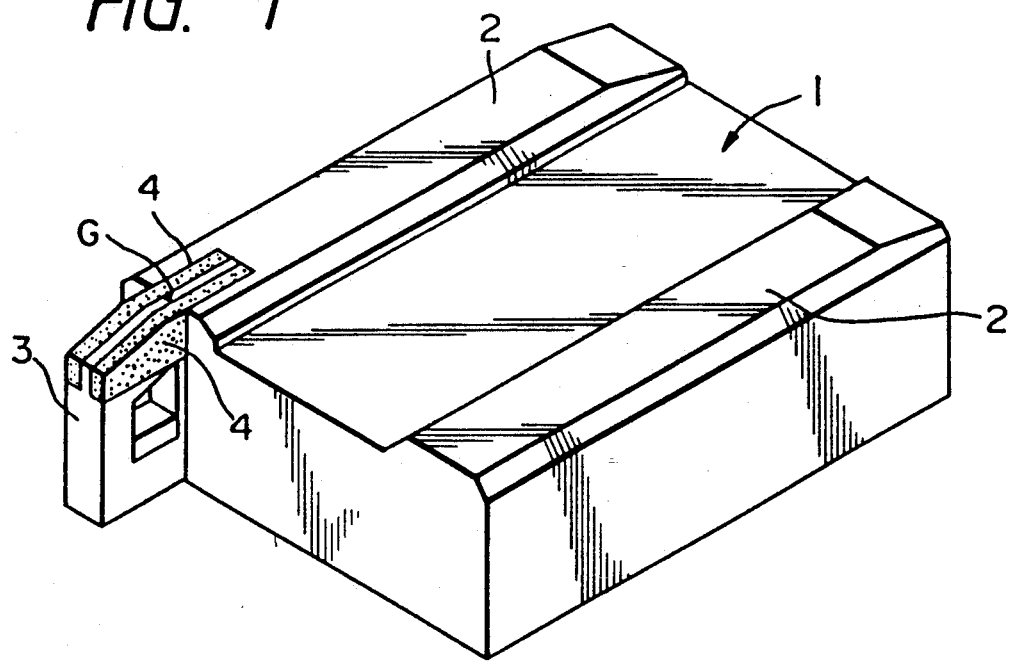
FIG. 1 is a perspective view showing an embodiment of a magnetic head according to the present invention.

FIG. 1 shows an example of a magnetic head configured utilizing a glass composition of the present invention.

A magnetic head A is an example wherein a glass composition of the present invention is used in two-rail type monolithic magnetic head. It has a configuration wherein two rails 2 are formed on the bottom side of a slider main body 1; a head core 3 is joined to the end of one of the rails 2; and a magnetic gap G formed between the head core 3 and the slider main body 1 is surrounded by a glass portion 4. The glass portion 4 is formed of a glass composition having any of the aforesaid compositions.

Figure 2:
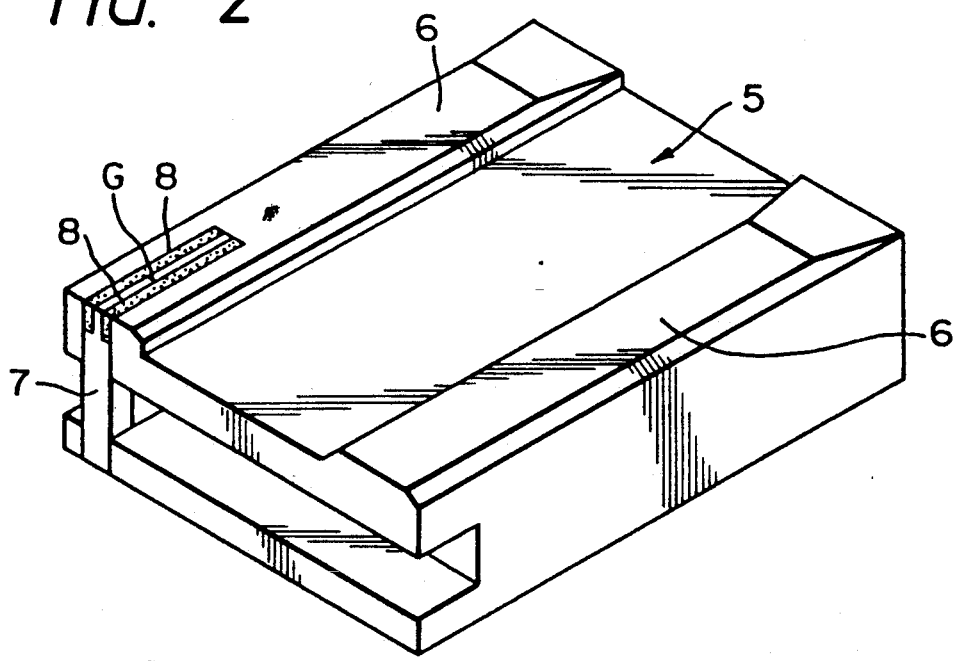
FIG. 2 is a perspective view showing another embodiment of a magnetic head according to the present invention.

A magnetic head B shown in FIG. 2 is an example wherein a glass composition of the present invention is used in a two-rail type monolithic magnetic head. It has a configuration wherein two rails 6 are formed on the bottom side of a slider main body 5; a groove is formed at the end of one of the rails 6; a head core 7 is joined to the groove; and a magnetic gap G formed in the groove is surrounded by a glass portion 8. The glass portion 8 is formed of a glass composition having any of the aforesaid compositions.

Since the glass portions 4 and 8 of the magnetic heads A and B having the above-described configurations, respectively, are formed of glass compositions of the present invention, when the sliders 1 and 5 are filled, no step is formed at the boundary portions of the sliders 1 and 5. This results in excellent moisture resistance which leads to excellent durability. In addition, since the glass-transition temperature for the glass portions 4 and 8 is low, the processing temperature during the glass-filling operation can be also set at a low value. This prevents the sliders 1 and 5 and head cores 3 and 7 from being affected by heat.

Example of fabrication

An example of the fabrication of the glass compositions of the present invention will now be described.

To obtain a glass composition having desired composition, materials are obtained and mixed to prepare a mixture which is in turn melted in a platinum pot at 950° C. for 60 minutes. The mixed composition and characteristics of the resulting glass composition are shown in Tables 1 to 4. The sample of a glass composition of the invention according to claim 1 is shown in Table 1 and an example to which it is to be compared is shown in Table 2. Samples of glass compositions of the inventions according to claims 2, 3 and 4 are shown in Table 3 and samples to which they are to be compared are shown in Table 4. In each table, $\alpha$ represents thermal expansion coefficients (30°-300° C., X $10^{-7} deg^{-1}$); Tg represents glass-transition points (°C.); and At represents yield points (°C.).

Flowability and the occurence of a step were checked in a manner wherein each sample is processed into a bar having a diameter of 0.4 mm; and the glass bar is placed above the gap of a ferrite core of a magnetic head; the glass is caused to penetrate into the gap by heating it at 550° C. for about 1 hour in an electric furnace in a nitrogen gas atmosphere; and it is checked whether a step is formed at the boundary between the glass and a slider. As a result, no step which can cause major problems in a magnetic head was formed.

The moisture resistance of this slider was evaluated. The evaluation of moisture resistance was carried out by leaving a mirror-finished slider in a moisture chamber having an atmosphere of 60° C. and 80% humidity for 100 hours and by observing it through a microscope with regard to discoloration and the like.

TABLE 1

| | (Embodiment) | | | | | |
|---|---|---|---|---|---|---|
| Sample | 1 | 2 | 3 | 4 | 5 | 6 |
| PbO | 28 | 30 | 33 | 35 | 35 | 33 |
| SiO$_2$ | 42 | 38 | 47.5 | 45 | 46 | 50 |
| B$_2$O$_3$ | 9 | 12 | — | 8 | 7 | 4 |
| Na$_2$O | 4 | 2.4 | 2 | 3 | 3 | 3 |
| K$_2$O | 0.5 | — | 1 | 3 | 1 | 2 |
| Li$_2$O | 5.5 | 5.6 | 2 | — | — | 1 |
| TeO$_2$ | 8 | 6 | 7.5 | 3 | 7 | 6 |
| TiO$_2$ | 3 | 5 | 1 | 2 | 1 | 2 |
| ZnO | — | 1.0 | 6 | — | — | — |
| α | 106 | 103 | 100 | 97 | 103 | 96 |
| Tg | 383 | 390 | 390 | 389 | 393 | 396 |
| At | 415 | 420 | 430 | 423 | 425 | 435 |
| moisture resistance | good | good | very good | good | good | very good |

TABLE 2

| | (Example for Comparison) | | | | |
|---|---|---|---|---|---|
| Sample | 7 | 8 | 9 | 10 | 11 |
| PbO | 27 | 47 | 30 | 30 | 33 |
| SiO$_2$ | 53 | 23 | 41 | 49.5 | 42 |
| B$_2$O$_3$ | 4.5 | 17 | 9 | 9 | 10 |
| Na$_2$O | 5 | 3 | 2 | 2 | 2 |
| K$_2$O | 0.5 | — | 1 | 0.6 | 1 |
| Li$_2$O | 5 | — | 5 | 5.5 | 4 |
| TeO$_2$ | — | — | 10 | 7.4 | 7.5 |
| TiO$_2$ | — | — | 2 | 6 | 0.5 |
| ZnO | 5 | (11) Al O | — | — | — |
| α | 96 | 95 | 110 | 103 | 105 |
| Tg | 395 | 376 | 385 | 388 | 380 |
| At | 430 | 405 | 417 | 421 | 411 |
| moisture resistance | no good | no good | no good | — | no good |

TABLE 3

| | (Embodiment) | | | | | |
|---|---|---|---|---|---|---|
| Sample | 12 | 13 | 14 | 15 | 16 | 17 |
| PbO | 30 | 36 | 40 | 36 | 33 | 35 |
| SiO$_2$ | 33 | 40 | 38 | 35 | 36 | 30 |
| B$_2$O$_3$ | 20 | 18 | 10 | 12 | 12 | 18 |
| ZnO | 3 | — | 4.5 | 6 | 6 | 5.8 |
| TeO$_2$ | 4 | — | 5 | 8 | 5 | — |
| Bi$_2$O$_3$ | 10 | 5.8 | 2 | — | 5 | 5 |
| SrO | — | — | — | 3 | 3 | 6 |
| Sb$_2$O$_3$ | — | 0.2 | 0.5 | — | — | 0.2 |
| α | 89 | 88 | 90 | 94 | 93 | 91 |
| Tg | 419 | 425 | 405 | 405 | 424 | 430 |
| At | 448 | 456 | 439 | 437 | 453 | 458 |
| moisture resistance | good | very good | good | good | very good | good |

TABLE 4

| | (Example for Comparison) | |
|---|---|---|
| Sample | 18 | 19 |
| PbO | 36 | 36 |
| SiO$_2$ | 36 | 34 |
| B$_2$O$_3$ | 18 | 20 |
| TeO$_2$ | 2 | 10 |
| Bi$_2$O$_3$ | 2 | — |
| ZnO | 6 | — |
| SrO | — | — |
| α | 83 | 92 |
| Tg | 420 | 405 |
| At | 451 | 436 |
| moisture resistance | — | no good |

Both of the embodiments of the present invention shown in Table 1 and Table 3 have preferable characteristics. The preferable range of thermal expansion cofficient for a magnetic head is from around 90 to around 105. The samples shown in Table 1 have thermal expansion coefficients in the range from 96 to 106 which is a preferable range, and the samples shown in Table 3 have thermal expansion coefficients in the range from 88 to 94 which is a preferable range. Further, since a glass composition for a magnetic head must be able to be worked on at the lowest possible temperature when the magnetic head is welded or filled, it is preferable that its glass-transition point and yield point are low. The samples according to the present invention shown in Table 1 have glass-transition temperatures in the range from 383° to 396° C. which are sufficiently low. The samples according to the present invention shown in Table 3 have glass-transition points in the range from 425° to 430° C. which are somewhat high but still sufficiently usable for a magnetic head. The samples shown in Tables 1 and 3 are all excellent in moisture resistance.

Compared to these samples according to the present invention, the samples for comparison shown in Table 2 have a problem concerning moisture resistance or crystallization, and the samples for comparison shown in FIG. 4 have a problem concerning moisture resistance or a problem that the thermal expansion coefficients are too low.

As described above, according to the present invention, it is possible to provide a glass composition preferable for use in a magnetic head, which has a low glass-transition point, which is hard to discolor, and which has excellent moisture resistance. Further, since a glass composition according to the present invention has a low glass-transition point and excellent flowability, no step will be formed between the glass composition and a slider of a magnetic head etc when the glass composition is poured into a groove in the slider. Therefore, a magnetic head which has no step in the area of a magnetic core, can be obtained.

Further, since a glass composition according to the present invention is excellent in moisture resistance, a magnetic head having no discoloration or corrosion at a glass portion and having no step can be obtained by filling the glass composition into a groove in a slider to form a magnetic gap surrounding a head core.

What is claimed is:

1. A moisture resistant low melting point glass composition consisting essentially of:
    (a) between 28 and 35% by molar ratio PbO,
    (b) between 38 and 50% by molar ratio SiO$_2$,
    (c) between 3 and 10% by molar ratio two oxides selected from the elements consisting of Na$_2$O, K$_2$O and Li$_2$O,
    (d) between 0 and 6% by molar ratio ZnO,
    (e) between 3 and 8% by molar ratio TeO$_2$, and
    (f) between 1 and 5% by molar ratio TiO$_2$.

2. A magnetic head wherein a head core surrounded by a glass portion is embedded in a groove formed in a slider and a magnetic gap is formed by the head core or by the head core and the slider, said glass portion comprising a moisture resistant low melting point glass composition consisting essentially of:
    (a) between 28 and 35% by molar ratio PbO;
    (b) between 38 and 50% by molar ratio SiO$_2$;
    (c) between 3 and 10% by molar ratio two oxides selected from the elements consisting of Na$_2$O, K$_2$O and Li$_2$O;
    (d) between 0 and 6% by molar ratio ZnO,
    (e) between 3 and 8% by molar ratio TeO$_2$; and
    (f) between 1 and 5% by molar ratio TiO$_2$.

3. A moisture resistant low melting point glass composition consisting essentially of:
 (a) between 30 and 40% by molar ratio PbO;
 (b) between 30 and 40% by molar ratio $SiO_2$;
 (c) between 10 and 20% by molar ratio $B_2O_3$;
 (d) between 0 and 6% by molar ratio SrO;
 (e) between 0 and 6% by molar ratio ZnO;
 (f) between 0 and 0.5% by molar ratio $SbO_3$;
 (g) between 0 and 8% by molar ratio $TeO_2$;
 (h) between 0 and 10% by molar ratio $Bi_2O_3$; and
wherein the molar ratios of $TeO_2$ and $Bi_2O_3$ satisfy the relation $TeO_2 + Bi_2O_3 \geqq 5\%$.

4. A magnetic head comprising a head core surrounded by a glass portion wherein said head portion comprises a moisture resistant low melting point glass composition consisting essentially of:
 (a) between 30 and 40% by molar ratio PbO;
 (b) between 30 and 40% by molar ratio $SiO_2$;
 (c) between 10 and 20% by molar ratio $B_2O_3$;
 (d) between 0 and 6% by molar ratio SrO;
 (e) between 0 and 6% by molar ratio ZnO;
 (f) between 0 and 0.5% by molar ratio $SbO_3$;
 (g) between 0 and 8% by molar ratio $TeO_2$;
 (h) between 0 and 10% by molar ratio $Bi_2O_3$; and
wherein the molar ratios of $TeO_2$ and $Bi_2O_3$ satisfy the relation $TeO_2 + Bi_2O_3 \geqq 5\%$.

* * * * *